United States Patent
Koernle et al.

(10) Patent No.: US 6,897,639 B2
(45) Date of Patent: May 24, 2005

(54) CIRCUIT ARRANGEMENT FOR THE POWER SUPPLY OF A TWO-WIRE SENSOR

(75) Inventors: Ralf Koernle, Zell a.H. (DE); Albert Woehrle, Aichhalden/Rotenbach (DE); Juergen Motzer, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 125 days.

(21) Appl. No.: 10/218,629

(22) Filed: Aug. 15, 2002

(65) Prior Publication Data

US 2003/0052657 A1 Mar. 20, 2003

(30) Foreign Application Priority Data

Sep. 19, 2001 (DE) .......................... 101 46 204

(51) Int. Cl.⁷ .............................................. G05F 1/573
(52) U.S. Cl. ...................................... 323/277; 323/908
(58) Field of Search ................................ 323/274, 275, 323/277, 280, 324, 908; 324/771, 537; 361/87, 93.9

(56) References Cited

U.S. PATENT DOCUMENTS

| | | | |
|---|---|---|---|
| 4,338,646 A | | 7/1982 | Davis et al. |
| 5,081,411 A | * | 1/1992 | Walker ........................ 323/326 |
| 5,345,166 A | | 9/1994 | Leonard et al. |
| 5,616,846 A | | 4/1997 | Kwasnik |
| 6,118,260 A | | 9/2000 | Kirkpatrick, II et al. |
| 6,437,581 B1 | * | 8/2002 | Blossfeld ..................... 324/600 |
| 2003/0052705 A1 | * | 3/2003 | Koemle et al. ............. 324/771 |

FOREIGN PATENT DOCUMENTS

| | | |
|---|---|---|
| DE | 39 04 363 A1 | 8/1990 |
| EP | 0 552 471 A1 | 7/1993 |
| EP | 0 618 681 A2 | 10/1994 |
| EP | 0 666 631 A2 | 8/1995 |
| EP | 0 895 209 A1 | 2/1999 |
| RU | 2 149 490 C1 | 5/2000 |
| WO | 87/07064 | 11/1987 |
| WO | 99/45621 | 9/1999 |

* cited by examiner

*Primary Examiner*—Jessica Han
(74) *Attorney, Agent, or Firm*—Gary M. Nath; Marvin C. Berkowitz; Teresa M. Arroyo

(57) ABSTRACT

A two-wire sensor (6) is attached to one pole of a voltage distribution source (U) by an initial connecting line (V1) in which a current-limiting resistor (R1) is positioned and is attached to the other pole by a second connecting line (V2). Parallel to the series connection consisting of the two-wire sensor (S) and the current-limiting resistor (R1) is at least one limiting diode (D1). A current regulator (SR) which is attached to the poles of the power source (U) regulates a parallel current (I) which runs parallel to the current through the two-wire sensor (D), so that there is a sum current at the poles of the power source (U) that always corresponds to the measured value delivered by the two-wire sensor (S). The regulating inputs of the current regulator (SR) are connected to the terminals of a current-sensing resistor (R2) positioned in a connecting line (V1). When a HART®-interface is used with the two-wire sensor (S) a HART®-resistor (RH) is positioned in one of the two connecting lines (V1).

4 Claims, 1 Drawing Sheet

CIRCUIT ARRANGEMENT FOR THE POWER SUPPLY OF A TWO-WIRE SENSOR

BACKGROUND OF THE INVENTION

The invention relates to a circuit arrangement for the power supply of a two-wire sensor which is attached to one pole of a voltage distribution source by an initial connecting line in which a current-limiting resistor is located and is attached to the other pole of the voltage distribution source by a second connecting line, and where at least one limiting diode is positioned parallel to the two-wire sensor and the current-limiting sensor.

Two-wire sensors consist of a measuring sensor, which measures a physical magnitude such as temperature, pressure, or the field strength of a magnetic field, and of electronic components for processing the signals delivered by the measuring sensor. Both the power source and the transmission of the measured and processed measuring signals are performed by only two lines, hence the term two-wire sensor. A two-wire sensor consequently has only two terminals, which simultaneously serve the power source and the transmission of the measured and processed measuring signals.

Two-wire sensors which are employed in areas exposed to the danger of explosion are guarded by a circuit arrangement for limiting current and voltage—so-called electrical barriers. To protect against excess voltages that might cause an ignition, the two connecting lines are connected by at least one limiting diode. To protect the sensor from excess currents, which can cause the sensor to overheat, a series resistor is inserted into the circuit behind the limiting diode.

Two-wire sensors equipped with a so-called HART® interface require a so-called HART®-resistor in one of the two connecting lines leading from the power source to the two-wire sensor, however. When the two-wire sensor is heavily loaded this additional resistor in one of the connecting lines can lead to an insufficiency in the distribution voltage required for the faultless operation of the two-wire sensor.

BRIEF SUMMARY OF THE INVENTION

The goal of the invention, therefore, is to provide a circuit arrangement for the power supply of a two-wire sensor such that excesses voltages and current are safely avoided, while a sufficient distribution voltage is continuously available.

The invention achieves this goal with the features indicated in claim 1, specifically in that the two poles of the power source are connected by a current regulator and a current sensor is positioned in one of the two connecting lines, while the terminals of the current sensor are connected to the regulating inputs of the current regulator.

The current regulator provided by the invention regulates a parallel current that runs parallel to the current flowing through the two-wire sensor, and in such a way that the sum voltage corresponding to the measured value recorded by the two-wire sensor is always provided at the poles of the power source. The parameters for the two-wire sensor are such that the required ratio of the sum current to the measured value establishes itself. A resistor will ideally serve as the current sensor.

BRIEF DESCRIPTION OF THE DRAWINGS

The invention will next be described and explained in greater detail on the basis of the figures.

The drawing shows.

DETAILED DESCRIPTION OF THE INVENTION

Figure 1:
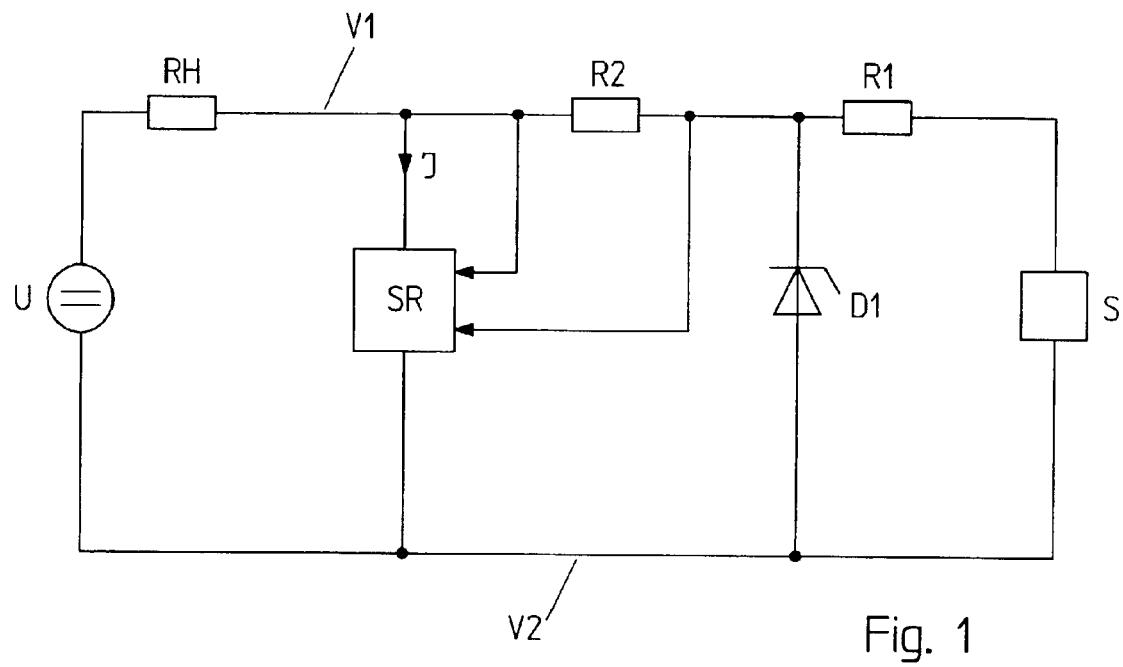
FIG. 1 a block diagram of the first exemplary embodiment of the invention

A block diagram of the first exemplary embodiment of the invention is reproduced in FIG. 1. One pole of a power source U is connected to the inlet of a two-wire sensor S by a series connection consisting of a HART®-resistor RH, a current-sensing resistor R2, and a current-limiting resistor R1, while the other inlet of the two-wire sensor S is connected to the other pole of the power source U via a connecting line V2. The HART®-resistor RH, the current-sensing resistor R2, and the current-limiting resistor R1 lie in a row within a connecting line V1. A current regulator R2 whose regulating inputs are connected to the terminals of the current-sensing resistor R2 lies between the shared node of the HART®-resistor RH and the connecting line V2. Parallel to the series connection consisting of the current-limiting resistor R1 and the two-wire sensor S lies a limiting diode D1. The function of the current-sensing resistor R2 can also be taken over by the current-limiting resistor R1. In this embodiment of the invention the current-sensing resistor is omitted. The regulating inputs of the current regulator SR are connected to the terminals of the resistor R1 serving both as limiting resistor and as current-sensing resistor.

As already mentioned, the current regulator SR regulates the parallel current I, which runs parallel to the current flowing through the two-wire sensor S and in such a way that the sum current corresponding to the measured value ascertained by the two-wire sensor S is always provided at the poles of the power source U. The two-wire sensor S is parametered accordingly.

In interaction with the limiting diode D1 the current regulator SR protects against excess voltages and currents, while at the same time assuring that a sufficiently high distribution voltage is available to the two-wire sensor S.

Figure 2:
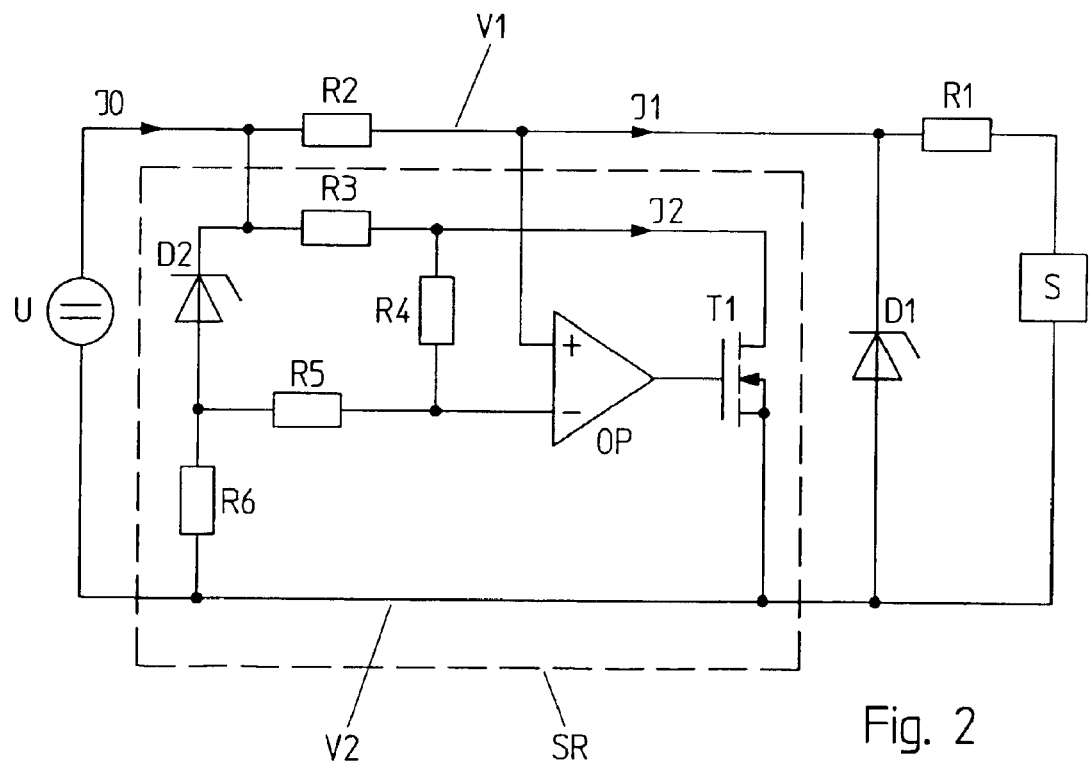
FIG. 2 a circuit diagram of the second exemplary embodiment of the invention.

A circuit diagram of a second exemplary embodiment of the invention is shown in FIG. 2.

One pole of a power source U is connected to one terminal of a two-wire sensor S by a series connection consisting of a current-sensing resistor R2 and a current-limiting resistor R1 which lie in a connecting line V1, while the other terminal of the two-wire sensor S is joined by a connecting line V2 to the other pole of the supply source U. One pole of the power source U is connected to the other pole of the power source U by a series connection consisting of a diode D2 and a resistor R6. In addition, one pole of the power source U is connected by a resistor R3 to the drain electrode of a field-effect transistor T1, whose source electrode is connected to the outlet of a operational amplifier OP. The inverted input of the operational amplifier OP is connected by a resistor R5 to the shared node of the diode D2 and the resistor R6 and is connected by a resistor R4 to the drain electrode of the field-effect transistor T1. The non-inverted input of the operational amplifier OP is connected to the joint node of the current-sensing resistor R2 and the current-limiting resistor R1. A limiting diode D1 lies parallel to the series connection consisting of the current-limiting resistor R1 and the two-wire sensor S.

The operational amplifier OP, the field-effect transistor T1, the resistors R3 to R6, and the diode D2 represent a current regulator SR.

The voltage drop caused by the current I1 at the current-sensing resistor R2 is recorded by the operational amplifier, which regulates the parallel current I2 in accordance with the ratio of the resistor R3 to the current-sensing resistor R2. With the suitable selection of the diode D2 in relation to the current-sensing resistor R2 it is possible to set the current I1 at which the regulation begins and the parallel current I2 begins to flow. It is thereby assured that the two-wire sensor S has sufficient power, even for a total current I0 of 4 mA.

The invention is particularly suited for two-wire sensors that are equipped with a HART®-interface and that are employed in areas exposed to explosive hazard.

LIST OF REFERENCE SYMBOLS

D1 limiting diode
D2 diode
I parallel current
I2 parallel current
I0 sum current
OP operational amplifier
R1 current-limiting resistor
R2 current-sensing resistor
R3–R6 resistor
RH HART®-resistor
S two-wire sensor
SR current regulator
T1 field-effect transistor
U voltage distribution source
V1 connecting line
V2 connecting line

What is claimed is:

1. A circuit arrangement for providing voltage to a two-wire sensor (S) which is attached to a power source (U) at a first pole by an initial connecting line (V1) in which a current-limiting resistor (R1) is positioned and which a two-wire sensor (S) is attached to the power source at a second pole by a second connecting line (V2), while at least one limiting diode (D1) is positioned parallel to the two-wire sensor (S) and the current-limiting resistor (R1), wherein the two poles of the power source (U) are connected by a current regulator (SR) having regulating inputs and in one of the two connecting lines (V1) a current sensor (R2) is positioned whose terminals are connected to the regulating inputs of the current regulator (SR).

2. A circuit arrangement according to claim 1, wherein the current-limiting resistor (R1) also serves as a current sensor.

3. A circuit arrangement according to claim 1, wherein the current sensor (R2) is a current-sensing resistor.

4. A circuit arrangement according to claim 3, wherein said first pole of the power source (U) is connected to one of the terminals of the two-wire sensor (S) by connecting line (V1) in which connecting line (V1) is positioned as a series connection consisting of the current-sensing resistor (R2) and the current-limiting resistor (R1), while the other terminal of the two-wire sensor (S) is connected by the second connecting line (V2) to the second pole of the power source (U); said first pole of the power source (U) is connected to the second pole of the power source (U) by a series connection consisting of a diode (D2) and an initial resistor (R6); said first pole of the power source (U) is connected by a second resistor (R3) to a drain electrode of a field-effect transistor (T1) having a source electrode connected to the second connecting line (V2); the shared node of the diode (D2) and the first resistor (R6) is connected by a third resistor (R5), and the drain electrode of the field-effect transistor (T1) is connected by a fourth resistor (R4) to the inverted input of an operational amplifier (OP) whose non-inverted input is connected to the shared node of the current-limiting resistor (R1) and the current-sensing resistor (R2) and wherein an outlet is attached to a gate electrode of the field-effect transistor (T1).

* * * * *